United States Patent Office 3,579,566
Patented May 18, 1971

3,579,566
REDUCTION OF ANHYDRIDES
Donald M. Fenton, Anaheim, Calif., assignor to Union
Oil Company of California, Los Angeles, Calif.
No Drawing. Filed Dec. 13, 1967, Ser. No. 690,067
Int. Cl. C07c 47/06, 69/16, 67/00
U.S. Cl. 260—488        10 Claims

ABSTRACT OF THE DISCLOSURE

A process for reduction of organic acid anhydrides comprising reacting the anhydride with hydrogen in the presence of a catalyst comprising a complex of a Group VIII noble metal with a biphyllic ligand from the group consisting of organic phosphines, organic arsines and organic stibines.

This invention relates to reduction of organic anhydrides with hydrogen to form products comprising dicarboxylates. Preparation of dicarboxylates by reaction of aldehydes and anhydrides is conventional and is disclosed in U.S. Pat. 2,866,813. The present invention, however, enables preparation of dicarboxylates from anhydrides without the necessity of separately preparing the aldehyde.

The reaction of the invention is believed to involve essentially a reduction of the anhydride to form the dicarboxylate according to the reaction

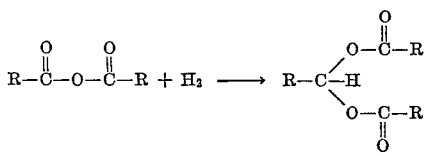

esters, in turn, are valuable for use as monomers in forma-
mixture of products, including aldehydes, esters, acids and unreacted anhydride, in addition to the particularly desired dicarboxylate. These may be readily separated by conventional means such as fractional distillation, chromatography, extraction, etc. The dicarboxylates are of particular value since they may be converted to unsaturated esters, such as vinyl esters, by thermal cracking. These esters, in turn, are valuable for use as monomers in formation of polyester resins. The carboxylates also find utility in formation of resins, useful as protective coatings, by copolymerization with monomers such as vinyl chloride.

The anhydrides employed in the invention may be those of any saturated or unsaturated fatty acid having up to about 20 carbon atoms. Examples are acetic anhydride, propionic anhydride, valeric anhydride, caprylic anhydride, stearic anhydride, etc.

The catalyst employed in the present invention comprises a complex of a Group VIII noble metal and a biphyllic ligand of phosphorous, arsenic or antimony.

The Group VIII noble metal can be palladium, rhodium, ruthenium, platinum, osmium, or iridium. While catalysts containing any of these metals are active for the reaction, rhodium-containing catalysts are preferred because of their greater activity, particularly at relatively mild reaction conditions.

The biphyllic ligand consists of organic phosphines, arsines or stibines. Of these, the phosphines are preferred. Examples of suitable biphyllic ligands are: trimethyl phosphine, triethyl arsine, triisopropyl stibine, ethyldiisopropyl stibine, tricyclohexyl phosphine, triphenyl phosphine, tri-(o-tolyl)phosphine, phenyldiisopropyl phosphine, phenyl diamyl phosphine, diphenylethylphosphine, tris(diethylaminomethyl)phosphine, ethylene bis(diphenyl phosphine), hexamethylene bis(diisopropyl arsine) pentamethylene bis(diethylstibine), etc. Of the aforementioned, the aryl phosphines are preferred because of their greater activity.

The noble metal-biphyllic ligand complex can be prepared externally and introduced into the reaction medium, or the complex may be prepared in situ by addition of a suitable noble metal compound and biphyllic ligand to the reaction mixture. The Group VIII noble metal can be added to the reaction medium as a soluble salt, a carbonyl compound or chelate. Examples of suitable salts are the nitrates and halides of the metals such as palladium chloride, palladium nitrate, rhodium acetate, ruthenium bromide, osmium fluoride, palladium chloride, etc. Examples of suitable chelates are palladium acetyl acetonate and complexes of the platinum group metal ions with such conventional chelating agents as ethylenediamine tetraacetic acid and its alkali metal salts, citric acid, etc.

A catalytic quantity of the Group VIII noble metal-containing catalyst is used. This is generally an amount sufficient to provide a concentration of the Group VIII noble metal which is between about 0.002 and about 2.0 weight percent of the liquid reaction medium and preferably between about 0.05 and about 0.5 weight percent.

The reaction is performed under liquid phase conditions, with or without the use of a reaction solvent. Any conventional solvent that is inert to the reactants, products and catalysts may be used, if desired. These include hydrocarbons, ethers, esters, etc. However, the reaction is normally conveniently and efficiently carried out without the use of such a solvent.

The reaction is performed under relatively mild conditions including temperatures from about 50° to about 250° C.; preferably from about 70° to about 150° C. Sufficient pressure is used to maintain the reaction medium in liquid phase. Although atmospheric pressure can be used, the rate of reaction is increased by superatmospheric pressures and, therefore, pressures from about 5 to about 300 atmospheres and preferably from about 10 to about 100 atmospheres are used. The ratio of the reactants can be widely varied, e.g., the molecular ratio of hydrogen to anhydride can be varied from about 1:10 to about 10:1. The preceding conditions are maintained by conventional means. Since the reaction is exothermic, the temperature can be maintained by suitable cooling of all or a portion of the reaction zone contents. The pressure can be maintained by the pressure of the gases supplied to the reaction zone. If desired, a suitable inert gas, such as carbon monoxide can also be charged to the reaction zone to reduce the partial pressures of the reacted gases, i.e., hydrogen and carbon monoxide.

The invention is more specifically illustrated by the following examples:

EXAMPLE 1

To 100 ml. of acetic anhydride, ⅓ g. rhodium trichloride and 1 g. triphenylphosphine in a 300 ml. bomb were added carbon monoxide to 200 p.s.i. and hydrogen to 1000 p.s.i. The mixture was rocked and heated to 100° C. for 2 hours and 200° C. for 2 hours. The final pressure was 600 p.s.i. The product was distilled to give 12.7 g. of a fraction boiling at 155–170° C., having a refractive index of 1.3992 at 23° C., and whose infrared spectrum was consistent for ethylidene diacetate. Reported refractive index of the diacetate is 1.3985 at 25° C. Other products were 1 g. ethylene glycol diacetate, 2.7 g. ethyl acetate, 0.2 g. acetaldehyde, 34 g. acetic acid and 35 g. acetic anhydride.

EXAMPLE 2

To 100 ml. acetic anhydride, 1 g. triphenylphosphine and ⅓ g. rhodium trichloride in a 300 ml. steel bomb were added carbon monoxide to 400 p.s.i. and hydrogen to 1000 p.s.i. The mixture was rocked and heated to 100° C. for 2 hours and 200° C. for 2 hours. The final pressure was 150 p.s.i. There was found 6.1 g. of ethylidene diacetate.

EXAMPLE 3

This example was similar to Example 2 except that the carbon monoxide was omitted and 800 p.s.i. hydrogen was used. The reaction resulted in formation of 1.5 g. acetaldehyde and 8.7 g. ethylidene diacetate.

EXAMPLE 4

To 100 ml. acetic anhydride, ½ g. palladium chloride, ⅓ g. ruthenium trichloride and 3 g. triphenylphosphine in a 300 ml. bomb was added carbon monoxide to 400 p.s.i. and hydrogen to 1200 p.s.i. The mixture was rocked and heated to 125° C. for 3 hours and 200° C. for 2 hours. The final pressure was 750 p.s.i. There was found 13 g. ethyl acetate and 8 g. of ethylidene diacetate.

I claim:

1. A process for reduction of a fatty acid anhydride of 1–20 carbon atoms to a product comprising a diester comprising reacting the anhydride with hydrogen in the presence of a catalyst comprising a complex of a Group VIII noble metal with a biphyllic ligand from the group consisting of trihydrocarbyl phosphines, arsines and stibines at a temperature of about 50 to 250° C. and at a pressure of about 100 to 4000 p.s.i.

2. The process of claim 1 in which the anhydride is acetic anhydride.

3. The process of claim 1 in which the Group VIII noble metal is rhodium.

4. The process of claim 1 in which the Group VIII noble metal is palladium.

5. The process of claim 1 in which the biphyllic ligand is triphenylphosphine.

6. The process of claim 1 in which the catalyst is present in an amount sufficient to provide about 0.002 to 2.0 weight percent of the noble metal.

7. The process of claim 1 wherein the biphyllic ligand is an arylphosphine.

8. The process of claim 3 wherein the biphyllic ligand is triphenylphosphine.

9. The process of claim 8 wherein said complex is formed in situ and wherein rhodium is added to the reaction medium as a halide.

10. The process of claim 9 wherein the halide is chloride.

References Cited

UNITED STATES PATENTS 2,105,540   1/1938   Lazier _____ 260—601

LORRAINE A. WEINBERGER, Primary Examiner

V. GAINER, Assistant Examiner

U.S. Cl. X.R.

260—601